United States Patent
Zhou et al.

(10) Patent No.: US 10,733,243 B2
(45) Date of Patent: Aug. 4, 2020

(54) NEXT GENERATION SIMILAR PROFILES

(71) Applicant: Microsoft Technology Licensing, LLC, Redmond, WA (US)

(72) Inventors: Runfang Zhou, Sunnyvale, CA (US); Ajit Paul Singh, San Francisco, CA (US); Anish Ramdas Nair, Maharashtra (IN); Sen Zhou, Millbrae, CA (US); Vladislav Tcheprasov, Lafayette, CA (US); Sachin Hosmani, Karnataka (IN); Da Teng, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 381 days.

(21) Appl. No.: 15/691,623

(22) Filed: Aug. 30, 2017

(65) Prior Publication Data
US 2019/0065598 A1 Feb. 28, 2019

(51) Int. Cl.
G06F 16/00 (2019.01)
G06F 16/951 (2019.01)
G06Q 50/00 (2012.01)

(52) U.S. Cl.
CPC .......... *G06F 16/951* (2019.01); *G06Q 50/01* (2013.01)

(58) Field of Classification Search
CPC ............................. G06F 16/951; G06Q 50/01
See application file for complete search history.

(56) References Cited

U.S. PATENT DOCUMENTS

| 8,386,516 | B2 * | 2/2013 | Owens ................. G06Q 10/063 707/776 |
| 8,849,813 | B1 * | 9/2014 | Iyer ....................... H04L 67/306 707/728 |
| 9,438,689 | B2 * | 9/2016 | Iyer ....................... H04L 67/306 |
| 9,811,569 | B2 * | 11/2017 | Posse ....................... H04L 67/22 |
| 10,042,940 | B2 * | 8/2018 | Agarwal ................ G06Q 10/00 |
| 10,592,518 | B2 * | 3/2020 | Posse .................... G06F 16/248 |
| 2006/0294086 | A1 * | 12/2006 | Rose ................... G06F 16/9535 |
| 2013/0301874 | A1 * | 11/2013 | Welch ................... G06F 16/951 382/103 |

(Continued)

OTHER PUBLICATIONS

"Office Action Issued in Chinese Patent Application No. 201811001587.2", dated Sep. 21, 2018, 02 Pages.

*Primary Examiner* — Jean M Corrielus
(74) *Attorney, Agent, or Firm* — Schwegman Lundberg & Woessner, P.A.

(57) ABSTRACT

A system, a machine-readable storage medium storing instructions, and a computer-implemented method described herein are directed to a Similar Profiles Engine. The Similar Profiles Engine generates an inverted index query based on one or more portions of profile data of a target member account of a social network service. The Similar Profiles Engine identifies respective profile data, of one or more candidate member accounts in the social network service, that maps to at least one inverted index filter, the at least one inverted index filter matching at least a portion of the inverted index query. The Similar Profiles Engine calculates a similarity score between each respective candidate member account and the target member account, and causes a display of identifiers of one or more candidate member accounts in a user interface of a client device based on respective similarity scores.

14 Claims, 7 Drawing Sheets

(56) References Cited

U.S. PATENT DOCUMENTS

| | | | |
|---|---|---|---|
| 2015/0120717 A1* | 4/2015 | Kim | G06F 16/335 707/727 |
| 2015/0134745 A1* | 5/2015 | Posse | G06F 16/248 709/204 |
| 2015/0169774 A1* | 6/2015 | Budzienski | G06Q 50/01 707/734 |
| 2016/0335603 A1* | 11/2016 | Davar | G06Q 10/1053 |
| 2017/0091692 A1* | 3/2017 | Guo | G06F 16/58 |
| 2017/0124089 A1* | 5/2017 | Posse | G06F 16/9535 |
| 2017/0364521 A1* | 12/2017 | Posse | G06F 16/248 |
| 2019/0005113 A1* | 1/2019 | Kenedy | G06F 16/285 |

* cited by examiner

NEXT GENERATION SIMILAR PROFILES

TECHNICAL FIELD

The subject matter disclosed herein generally relates to the technical field of special-purpose machines that identify similarities between member accounts including software-configured computerized variants of such special-purpose machines and improvements to such variants, and to the technologies by which such special-purpose machines become improved compared to other special-purpose machines that identify similarities between member accounts.

BACKGROUND

A social networking service is a computer- or web-based application that enables users to establish links or connections with persons for the purpose of sharing information with one another. Some social networking services aim to enable friends and family to communicate with one another, while others are specifically directed to business users with a goal of enabling the sharing of business information. For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks").

With many social networking services, members of the social networking services (hereinafter also "members") are prompted to provide a variety of personal information, which may be displayed in a member's personal web page. Such information is commonly referred to as personal profile information, or simply "profile information", and when shown collectively, it is commonly referred to as a member's profile. For example, with some of the many social networking services in use today, the personal information that is commonly requested and displayed includes a member's age, gender, interests, contact information, home town, address, the name of the member's spouse and/or family members, and so forth. With certain social networking services, such as some business networking services, a member's personal information may include information commonly included in a professional resume or curriculum vitae, such as information about a person's education, employment history, skills, professional organizations, and so on. With some social networking services, a member's profile may be viewable to the public by default, or alternatively, the member may specify that only some portion of the profile is to be public by default. Accordingly, many social networking services serve as a sort of directory of people to be searched and browsed.

DESCRIPTION OF THE DRAWINGS

Some embodiments are illustrated by way of example and not limitation in the figures of the accompanying drawings in which.

DETAILED DESCRIPTION

Figure 1:
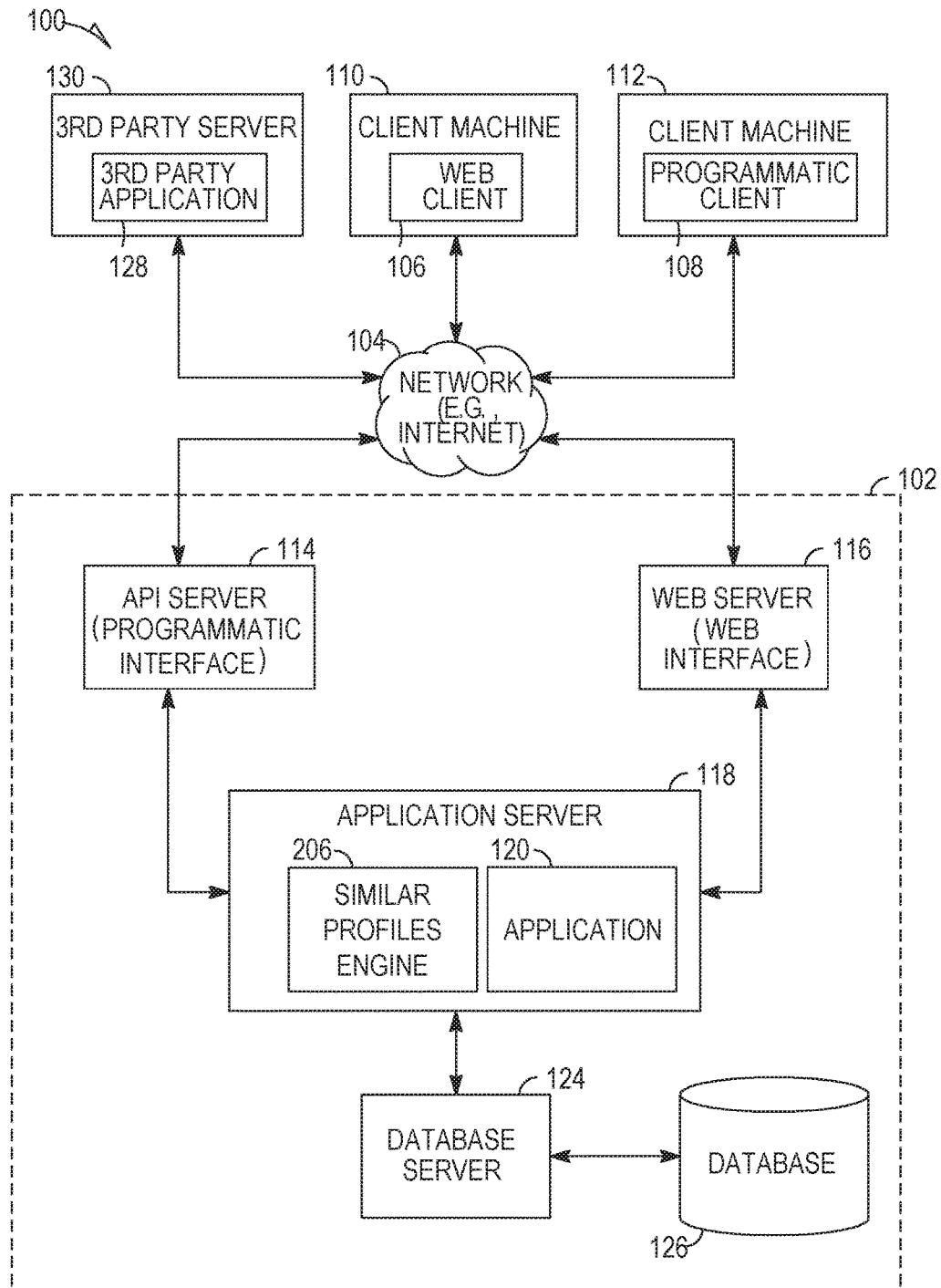
FIG. 1 is a block diagram illustrating a client-server system, in accordance with an example embodiment.

The present disclosure describes methods and systems for a Similar Profiles Engine in a professional social networking service (also referred to herein as a "professional social network," a "social network," a "social network service," or "SNS"). In the following description, for purposes of explanation, numerous specific details are set forth in order to provide a thorough understanding of the various aspects of different embodiments of the subject matter described herein. It will be evident, however, to one skilled in the art, that the subject matter described herein may be practiced without all of the specific details.

A system, a machine-readable storage medium storing instructions, and a computer-implemented method described herein are directed to a Similar Profiles Engine. The Similar Profiles Engine generates an inverted index query based on one or more portions of profile data of a target member account of a SNS. The Similar Profiles Engine identifies respective profile data, of one or more candidate member accounts in the SNS, that maps to one or more inverted index filters matched with at least a portion of the inverted index query. The Similar Profiles Engine calculates a similarity score between each respective candidate member account and the target member account.

According to various embodiments, the Similar Profiles Engine receives, as input, profile data of a SNS member account ("target member account") and returns a list of other SNS member accounts that have respective profile data similar to the input profile data of the target member account in some sense (e.g. textual similarity of the profiles, similar skills, etc.). The returned member accounts are presented in a listing and ordered in decreasing measure of similarity with respect to the target member account.

Various embodiments of the Similar Profiles Engine include powering a search feature in a SNS recruiter functionality that helps recruiter accounts find candidate accounts similar to a select candidate account that has already been identified as a viable choice for an active job post, as an audience expansion operator functionality to trigger display targeted ads to an increased number of member accounts given an initial set of member accounts and other embodiments to power other types of social network relevance engines.

The Similar Profiles Engine implements a Short Listing phase and a Scoring phase. By doing so, the Similar Profiles Engine solves an information retrieval problem where, for a target member account, a short-list of member accounts that are likely to be similar to the target member account is generated, and then each short-list member account is assigned a score value according to various similarity measures. Short listing may be important because it is infeasible to look at each of the millions of member accounts on a SNS as a potential similar profile for each respective target member account (which would mean, for example, 500M× 500M member account inspections). In various embodiments, the Similar Profiles Engine executes a machine learning algorithm during the Scoring phase where each score value is determined based on pre-defined features (and their corresponding coefficients) that are present in member account pairs.

It is understood that various embodiments described herein include encoded instructions that comprise operations to generate one or more user interfaces and various user interface elements. The user interface and the various user interface elements can be displayed to be representative of any type of data, operation, and calculation result described herein. In addition, the user interface and various user interface elements are generated by the Similar Profiles Engine for display on a computing device, a server computing device, a mobile computing device, etc.

It is understood that a machine learning data model is represented according to one more encoded instructions that, when executed, perform calculations that result in inferences, predictions, conclusions, estimations, and score values based in part on the training data. In one example, the machine learning data model can be a logistic regression model having one or more encoded instructions for feature vector assembly used for scoring member account pairs.

As described in various embodiments, the Similar Profiles Engine may be a configuration-driven system for building, training, and deploying prediction models for determining relevance of articles for a target member account. In particular, the operation of the Similar Profiles Engine is completely configurable and customizable by a user through a user-supplied configuration file such as a JavaScript Object Notation (JSON), eXtensible Markup Language (XML) file, etc.

For example, each module in the Similar Profiles Engine may have text associated with it in a configuration file(s) that describes how the module is configured, the inputs to the module, the operations to be performed by the module on the inputs, the outputs from the module, and so on. Accordingly, the user may rearrange the way these modules are connected together as well as the rules that the various modules use to perform various operations. Thus, whereas conventional prediction modelling is often performed in a fairly ad hoc and code driven manner, the modules of the Similar Profiles Engine may be configured in a modular and reusable fashion, to enable more efficient prediction modelling, such as via a machine learning algorithm and data model.

Turning now to FIG. 1, FIG. 1 is a block diagram illustrating a client-server system, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102. In some embodiments, the networked system 102 may comprise functional components of a professional social network.

Figure 2:
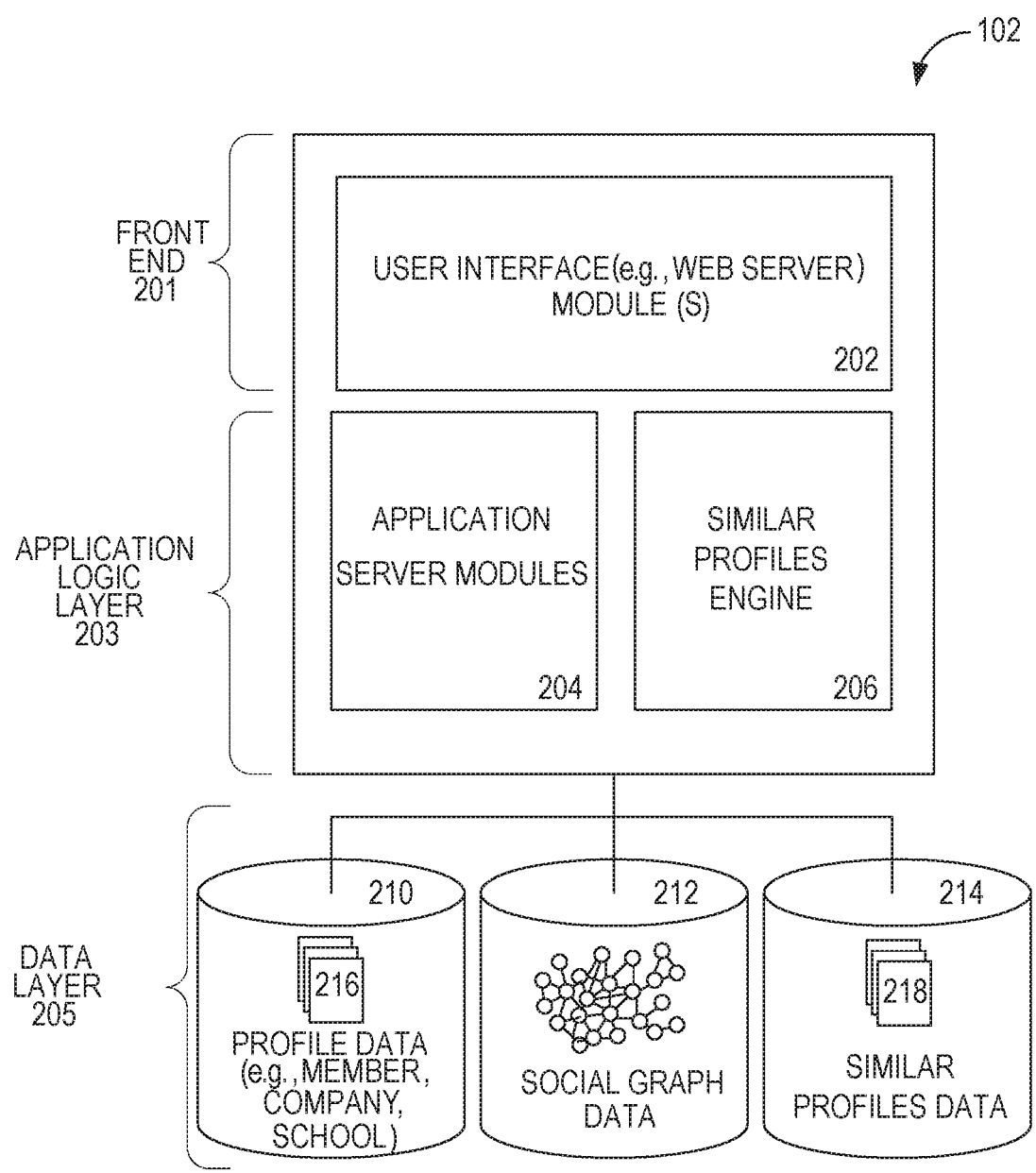
FIG. 2 is a block diagram showing functional components of a professional social network within a networked system, in accordance with an example embodiment.

FIG. 2 is a block diagram showing functional components of a professional social network within the networked system 102, in accordance with an example embodiment.

As shown in FIG. 2, the professional social network may be based on a three-tiered architecture, consisting of a front-end layer 201, an application logic layer 203, and a data layer 205. In some embodiments, the modules, systems, and/or engines shown in FIG. 2 represent a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 2. However, one skilled in the art will readily recognize that various additional functional modules and engines may be used with a professional social network, such as that illustrated in FIG. 2, to facilitate additional functionality that is not specifically described herein. Furthermore, the various functional modules and engines depicted in FIG. 2 may reside on a single server computer, or may be distributed across several server computers in various arrangements. Moreover, although a professional social network is depicted in FIG. 2 as a three-tiered architecture, the inventive subject matter is by no means limited to such architecture. It is contemplated that other types of architecture are within the scope of the present disclosure.

As shown in FIG. 2, in some embodiments, the front-end layer 201 comprises a user interface module (e.g., a web server) 202, which receives requests and inputs from various client-computing devices, and communicates appropriate responses to the requesting client devices. For example, the user interface module(s) 202 may receive requests in the form of Hypertext Transport Protocol (HTTP) requests, or other web-based, application programming interface (API) requests.

In some embodiments, the application logic layer 203 includes various application server modules 204, which, in conjunction with the user interface module(s) 202, generates various user interfaces (e.g., web pages) with data retrieved from various data sources in the data layer 205. In some embodiments, individual application server modules 204 are used to implement the functionality associated with various services and features of the professional social network. For instance, the ability of an organization to establish a presence in a social graph of the SNS, including the ability to establish a customized web page on behalf of an organization, and to publish messages or status updates on behalf of an organization, may be services implemented in independent application server modules 204. Similarly, a variety of other applications or services that are made available to members of the SNS may be embodied in their own application server modules 204.

As shown in FIG. 2, the data layer 205 may include several databases, such as a database 210 for storing profile data 216, including both member profile attribute data as well as profile attribute data for various organizations. Consistent with some embodiments, when a person initially registers to become a member of the professional social network, the person will be prompted to provide some profile attribute data such as, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information may be stored, for example, in the database 210. Similarly, when a representative of an organization initially registers the organization with the professional social network the representative may be prompted to provide certain information about the organization. This information may be stored, for example, in the database 210, or another database (not shown). With some embodiments, the profile data 216 may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or a seniority level within a particular company. With some embodiments, importing or otherwise accessing data from one or more externally hosted data sources may enhance profile data 216 for both members and organizations. For instance, with companies in particular, financial data may be imported from one or more external data sources, and made part of a company's profile.

The profile data 216 may also include information regarding settings for members of the professional social network. These settings may comprise various categories, including, but not limited to, privacy and communications. Each category may have its own set of settings that a member may control.

Once registered, a member may invite other members, or be invited by other members, to connect via the professional social network. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, may be stored and maintained as social graph data within a social graph database 212.

The professional social network may provide a broad range of other applications and services that allow members the opportunity to share and receive information, often customized to the interests of the member. For example, with some embodiments, the professional social network may include a photo sharing application that allows members to upload and share photos with other members. With some embodiments, members may be able to self-organize into groups, or interest groups, organized around a subject matter or topic of interest. With some embodiments, the professional social network may host various job listings providing details of job openings with various organizations.

In some embodiments, the professional social network provides an application programming interface (API) module via which third-party applications can access various services and data provided by the professional social network. For example, using an API, a third-party application may provide a user interface and logic that enables an authorized representative of an organization to publish messages from a third-party application to a content hosting platform of the professional social network that facilitates presentation of activity or content streams maintained and presented by the professional social network. Such third-party applications may be browser-based applications, or may be operating system-specific. In particular, some third-party applications may reside and execute on one or more mobile devices (e.g., a smartphone, or tablet computing devices) having a mobile operating system.

The data in the data layer 205 may be accessed, used, and adjusted by the Similar Profiles Engine 206 as will be described in more detail below in conjunction with FIGS. 3-7. Although the Similar Profiles Engine 206 is referred to herein as being used in the context of a professional social network, it is contemplated that it may also be employed in the context of any website or online services, including, but not limited to, content sharing sites (e.g., photo- or video-sharing sites) and any other online services that allow users to have a profile and present themselves or content to other users. Additionally, although features of the present disclosure are referred to herein as being used or presented in the context of a web page, it is contemplated that any user interface view (e.g., a user interface on a mobile device or on desktop software) is within the scope of the present disclosure. In one embodiment, the data layer 205 further includes a database 214 that includes similar profiles data 218. The similar profiles data 218 includes instructions representative of a score model, training data, features, regression coefficients, inverted indices, and inverted index filters.

Figure 3:
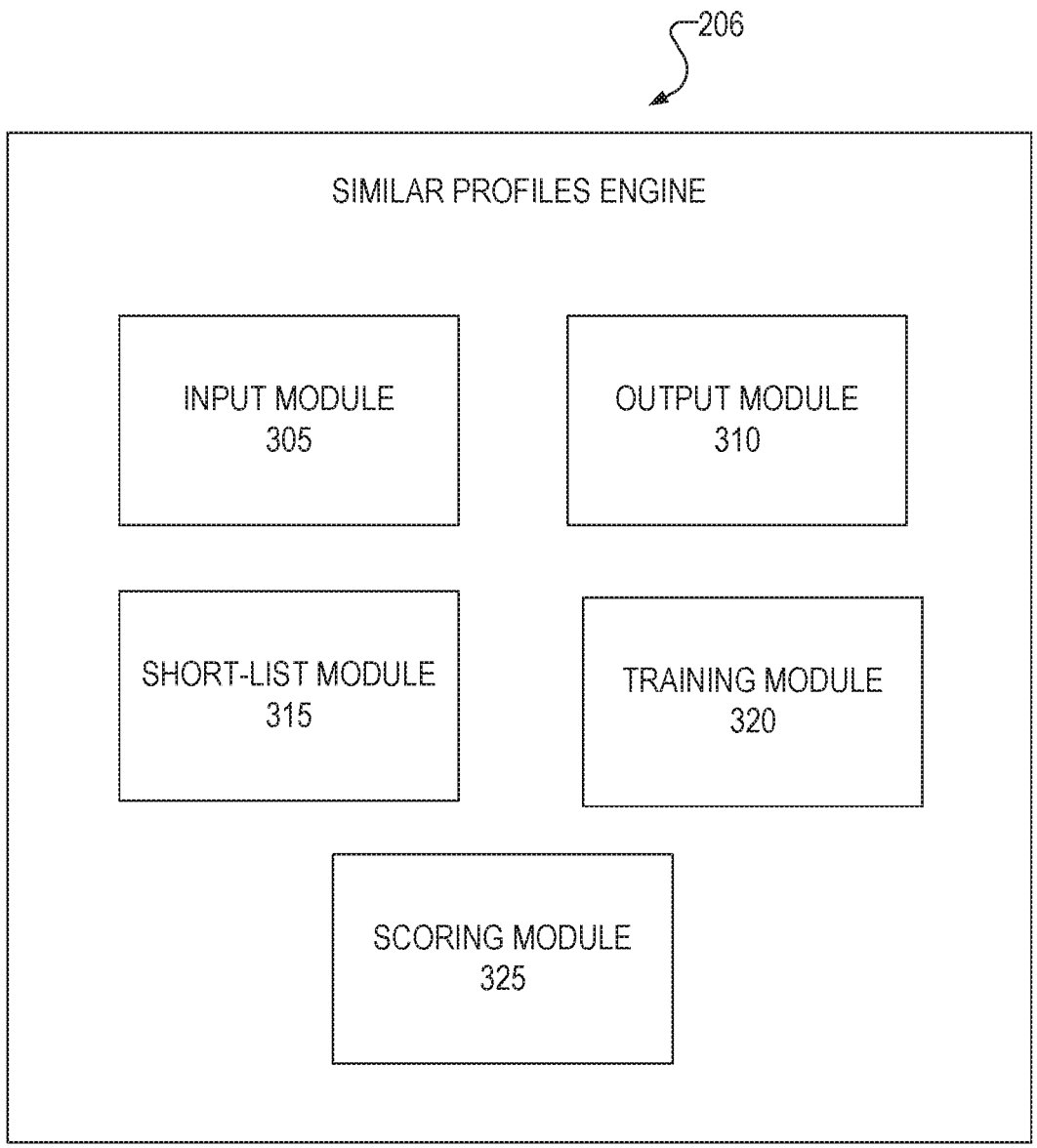
FIG. 3 is a block diagram showing example components of a Similar Profiles Engine, according to some embodiments.

FIG. 3 is a block diagram showing example components of a Similar Profiles Engine 206, according to some embodiments.

The input module 305 is a hardware-implemented module that controls, manages, and stores information related to any inputs from one or more components of system 102 as illustrated in FIG. 1 and FIG. 2. In various embodiments, the inputs include profile data of a target member account and an inverted index query generated based on the profile data of the target member account.

The output module 310 is a hardware-implemented module that controls, manages, and stores information related to outputs, and that sends outputs to one or more components of system 100 of FIG. 1 (e.g., one or more client devices 110, 112, third party server 130, etc.). In some embodiments, an output is a short-list of identifiers of candidate member accounts and respective similarity scores for each candidate member account in the short-list.

The short-list module 315 is a hardware implemented module that manages, controls, stores, and accesses information related to generating a short-list of candidate member accounts. In some embodiments, the short-list module 315 populates inverted indices, generates inverted index filters, and stores generated inverted index filters in a record of a database.

The training module 320 is a hardware-implemented module that manages, controls, stores, and accesses information related to generating a scoring model, such as machine learned logistic regression data model.

As understood by those skilled in the art, logistic regression is an example of a statistics-based machine learning technique that uses a logistic function. The logistic function is based on a variable, referred to as a logit. The logit is defined in terms of a set of regression coefficients of corresponding independent predictor variables. Logistic regression can be used to predict the probability of occurrence of an event given a set of independent/predictor variables. The independent/predictor variables of the logistic regression model are the attributes represented by the assembled feature vectors described throughout. The regression coefficients may be estimated using maximum likelihood or learned through a supervised learning technique from data collected (such data representing a member account profiles selected from a search result listings presented to one or more searching member accounts) in logs or calculated from log data, as described in more detail below.

Accordingly, once the appropriate regression coefficients are determined, the features included in an assembled feature vector may be input to the machine learning data model in order to predict the probability that the event Y occurs (where the event Y may be, for example, whether a target member account will send a request to establish a social network connection with a given member account due to their similarity score calculated by the machine learning data model).

In other words, provided an assembled feature vector including various features associated with a target member account, a particular content item, a particular context, and so on, the assembled feature vector may be applied to a logistic regression model to determine the probability that the particular member account will respond to the particular content item in a particular way (e.g., receipt of a mouse click, a request to access, a user selection) given the particular context. Logistic regression is well understood by those skilled in the art, and will not be described in further detail herein, in order to avoid occluding various aspects of this disclosure.

It is understood that the training module 320 may use various other prediction modelling techniques understood by those skilled in the art. For example, other prediction modelling techniques may include other machine learning models such as a Naïve Bayes model, a support vector machines (SVM) model, a decision trees model, and a neural network model, all of which are understood by those skilled in the art. Also, according to various example embodiments, the training module 320 may be used for the purposes of both off-line training and online inferences.

The training module 320 generates encoded instructions 512 representative of the machine learning data model. The Similar Profiles Engine 206 assembles vectors according to the encoded instructions. The encoded instructions indicate a vector position for each type of feature. For example, the Similar Profiles Engine 206 assembles a coefficient vector based on the regression coefficients for features present in a pair of member accounts. Each regression coefficient is positioned in the coefficient vector at the vector position for its corresponding feature. For example, a first regression coefficient of a first type of feature is placed in the coefficient vector at the first type of feature's assigned vector position. A second regression coefficient of a second type of feature is placed in the coefficient vector at the second type of feature's assigned vector position.

The Similar Profiles Engine 206 assembles a target feature vector based on the profile data of a member account pairing. For example, if the first type of feature is present in the member account pairing, then a first value is placed in the target feature vector at the first type of feature's assigned vector position. The first value can be a "1" to represent presence of the first type of feature in the profile data. In other embodiments, the first value can be a pre-defined value for the first type of feature in the profile data.

The training data for the scoring model is sourced from previous social network behaviours of one or more members of the SNS who are associated with one or more member accounts. Each portion of the training data is generated (e.g., captured, identified, determined, etc.) based on data pertaining to various members' searches for similar member accounts, wherein the searching members' clicks on (e.g., selection of) particular search results implying that the selected search results (e.g., another member account returned as part of the search results) are good suggestions (e.g., positive labels), and not clicking on (or not selecting of) a member account that is presented immediately above a selected member account implying that it was a bad suggestion (e.g., a negative label).

By training the machine learned logistic regression model on such training data, the Similar Profiles Engine 206 thereby maximizes the chances of a target member account clicking (selecting) a member account that is presented to the target member account as a recommended similar member account in a notification that recommends that the target member account should establish a social network connection with the recommended similar member account. It is understood that the scoring model contains one or more features, such as similarity between skill identifiers, profile summary sections, educational degrees obtained, etc. The scoring model contains coefficients for each of the features which implies the relative importance (or "predictiveness") learned for each of the features.

The scoring module 325 is a hardware implemented module which manages, controls, stores, and accesses information related to calculating similarity scores for member account pairings. In some embodiments, a cross-product of the target feature vector for a given member account pairing and the coefficient vector for that given member account pairing returns a similarity score the given member account pairing.

Figure 4:
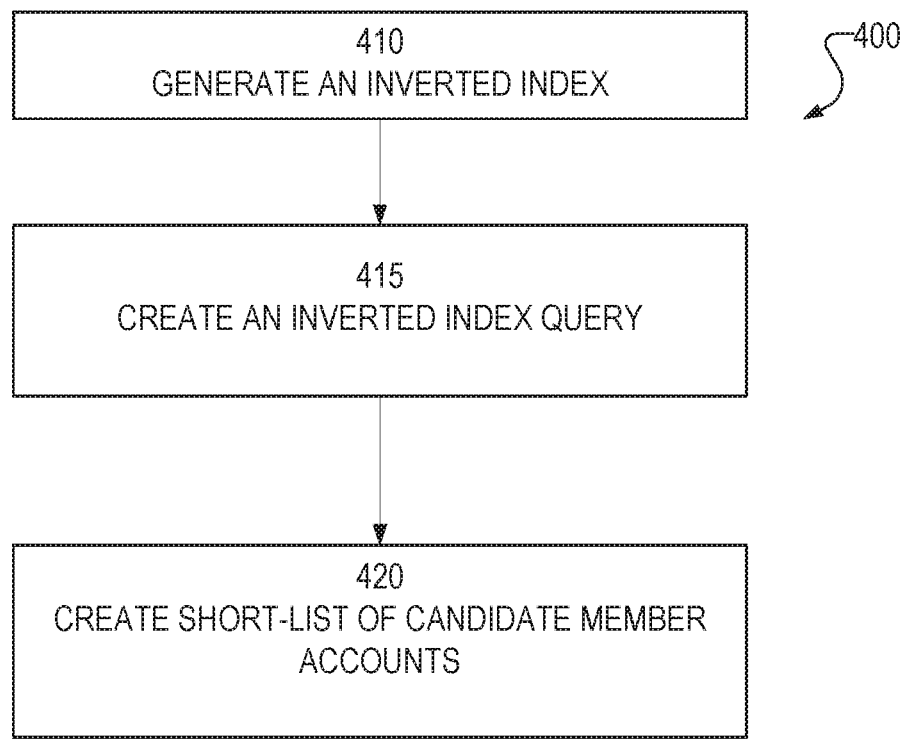
FIG. 4 is a flowchart illustrating an example Short List phase method of a Similar Profiles Engine, according to various embodiments.

FIG. 4 is a flowchart 400 illustrating an example Short List phase method of a Similar Profiles Engine 206, according to various embodiments.

At operation 410, the Similar Profiles Engine 206 generates an inverted index based on one or more inverted index filters. An inverted index filter is an equality predicate that gets applied on an inverted index field to filter out documents from the inverted index. The inverted index filters may be composed in a nested boolean manner to finely control the set of documents retrieved. The inverted index is implemented and utilized for the Short List phase of the Similar Profiles Engine 206. An inverted index maps a potential search term to a list of member account identifiers that each have that potential search term in their respective profile data.

For example, for search terms that map to a particular combination of skill tags (e.g., "Venture Capital" and "Sustainable Management"), the inverted index contains a list of member identifiers of the member accounts who have that combination of skill tags. A skill tag represents a standardized numeric identifier (also "ID") that uniquely identifies a skill. A member might have multiple skill tags associated with the member's profile. The Similar Profiles Engine 206 creates an inverted index filter based on the particular combination of skill tags (e.g., "Venture Capital" and "Sustainable Management"), and inserts the inverted index filter into the inverted index. In some instances, the inverted index filer may be based on a single skill tag rather than a combination of skill tags. The list of member identifiers is stored in the inverted index in association with (e.g., in relation to) the inverted index filter. It is understood that the Similar Profiles Engine 206 inserts one or more inverted index filters into the inverted index. In addition, each inverted index filter is stored in relation to a list of member identifiers.

At operation 415, the Similar Profiles Engine 206 creates (e.g., generates) an inverted index query (also, a "rewritten query"). For example, the Similar Profiles Engine receives a query to the system in the form of a target member account identifier. Based on the target member account identifier, the Similar Profiles Engine converts the received query into a rewritten query based on the profile data of the target member account. The Similar Profiles Engine populates the rewritten query with one or more portions of profile data of the target member account, such as a country code, language identifier, identifiers of industries, skill identifiers, or job title identifiers. A rewritten query is a representation of the one or more inverted index filters applied to the inverted index (e.g., by the Similar Profiles Engine) in order to filter out relevant member accounts. For example, a rewritten query populated with portions of profile data of the target member account, such as "'US' and 'software engineers' and 'Java,'" instructs a machine to retrieve member accounts, from the inverted index, that, based on their respective profile data, represent users who "are in the US and are software engineers and are skilled in Java". The rewritten queries may be populated through a rewriting model derived by using one or more decision trees. A rewritten query can be further expanded by adding the target member account's industry identifiers and company identifiers to improve data retrieval. The rewritten queries are understood by the underlying search system.

For example, the Similar Profiles Engine 206 accesses profile data of a target member account, and utilizes one or more portions of the profile data as content of an inverted index query. The types of profile data used for the inverted index query can be pre-defined so as to match the type of profile data used to create the inverted index filters. For example, the inverted index query can be based on one or more keywords present in a profile text section of profile of the target member account (such as keyword "software" and keyword "mobile") present in a profile summary text section).

At operation 420, the Similar Profiles Engine 206 creates a short-list of candidate member accounts. The Similar Profiles Engine 206 combines (e.g., selects, aggregates, etc.) the member account identifiers that are listed in relation to inverted index filters that match respective portions of the inverted index query. The Similar Profiles Engine 206 includes the member account identifiers in a short-list of member accounts that will be utilized in a Scoring phase.

Figure 5:
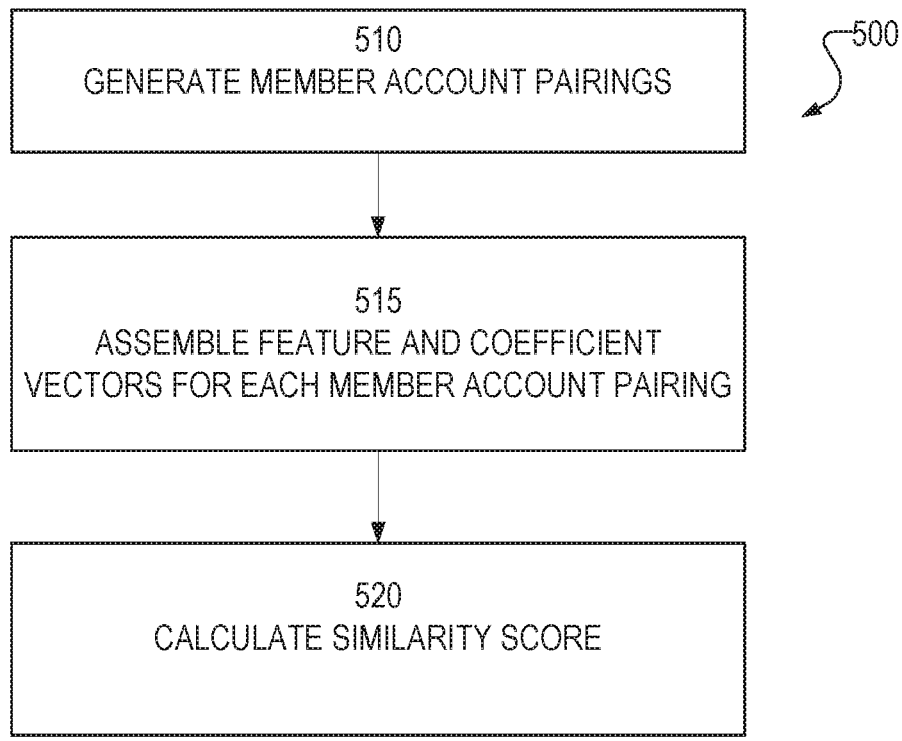
FIG. 5 is a flowchart illustrating an example Scoring phase method of a Similar Profiles Engine, according to various embodiments.

FIG. 5 is a flowchart 500 illustrating an example scoring phase method of a Similar Profiles Engine 206, according to various embodiments.

After the Short Listing phase, in which a short-list of candidate member accounts is retrieved from the inverted index, the Similar Profiles Engine 206 performs a Scoring phase to score each of the short-listed member accounts according to a scoring model. Such scoring is performed because the short list is retrieved from the inverted index against minimal filtering constraints, and further additional filtering allows for the identification of candidate member accounts that are the most similar (or most relevant) to the target member account. In addition, the scoring is performed to order the similar candidate member accounts in a decreasing measure of their respective similarity with respect to the target member account. In various embodiments, the scoring model of the Similar Profiles Engine is a machine learned logistic regression model.

At operation 510, the Similar Profiles Engine 206 generates member account pairings. The Similar Profiles Engine 206 creates a pairing between the target member account and each candidate member account in the short-list. That is, the Similar Profiles Engine 206 creates a first pairing between the target member account and a first candidate member account in the short-list, a second pairing between the target member account and a second candidate member account in the short-list, and so on.

At operation 515, the Similar Profiles Engine 206 assembles feature and coefficient vectors for each member account pairing. Hence, for the first pairing, the Similar Profiles Engine 206 assembles feature and coefficient vectors based on pre-defined features that are present between the member accounts in the first pairing. For the second pairing, the Similar Profiles Engine 206 assembles feature and coefficient vectors based on pre-defined features that are present between the member accounts in the second pairing, and so on.

At operation 520, the Similar Profiles Engine 206 calculates (e.g., generates, computes, determines, etc.) a similarity score for each member account pairing. For example, the Similar Profiles Engine 206 calculates a first cross product of the feature and coefficient vectors of the first pairing to calculate a similarity score for the first pairing. The Similar Profiles Engine 206 calculates a second cross product of the feature and coefficient vectors of the second pairing to calculate a similarity score for the second pairing. It is understood that various example embodiments are not limited to only two pairings. There can be any number of pairings based on a number of candidate member accounts in the short-list. The similarity score may be stored in a record of a database in association with the respective member account pairing, with the target member account, with the respective candidate member account, or with any suitable combination thereof.

In some example embodiments, once the similarity score is generated, the Similar Profiles Engine 206 transmits instructions to a client device of a target member to cause a display of identifiers of one or more of the candidate member accounts in a user interface of the client device. The one or more of the candidate member accounts may be selected based on respective similarity score values. In some instances, one or more candidate member accounts from the short-list are caused to display in a user interface of the client device. In various example embodiments, the displayed candidate member accounts may be ordered based on respective similarity scores from highest to lowest. The target member may then request to view one or more profiles associated with the candidate member accounts, or may establish connections with the one or more candidate member accounts presented.

According to various example embodiments, an online user (e.g., a recruiter, a member of the SNS, a sales person, etc.) who views a target member profile, can also be presented with identifiers of one or more candidate member accounts that have profiles that are similar to the target member profile, and can view the profiles of the one or more candidate member accounts because they are similar to the target member profile.

Figure 6:
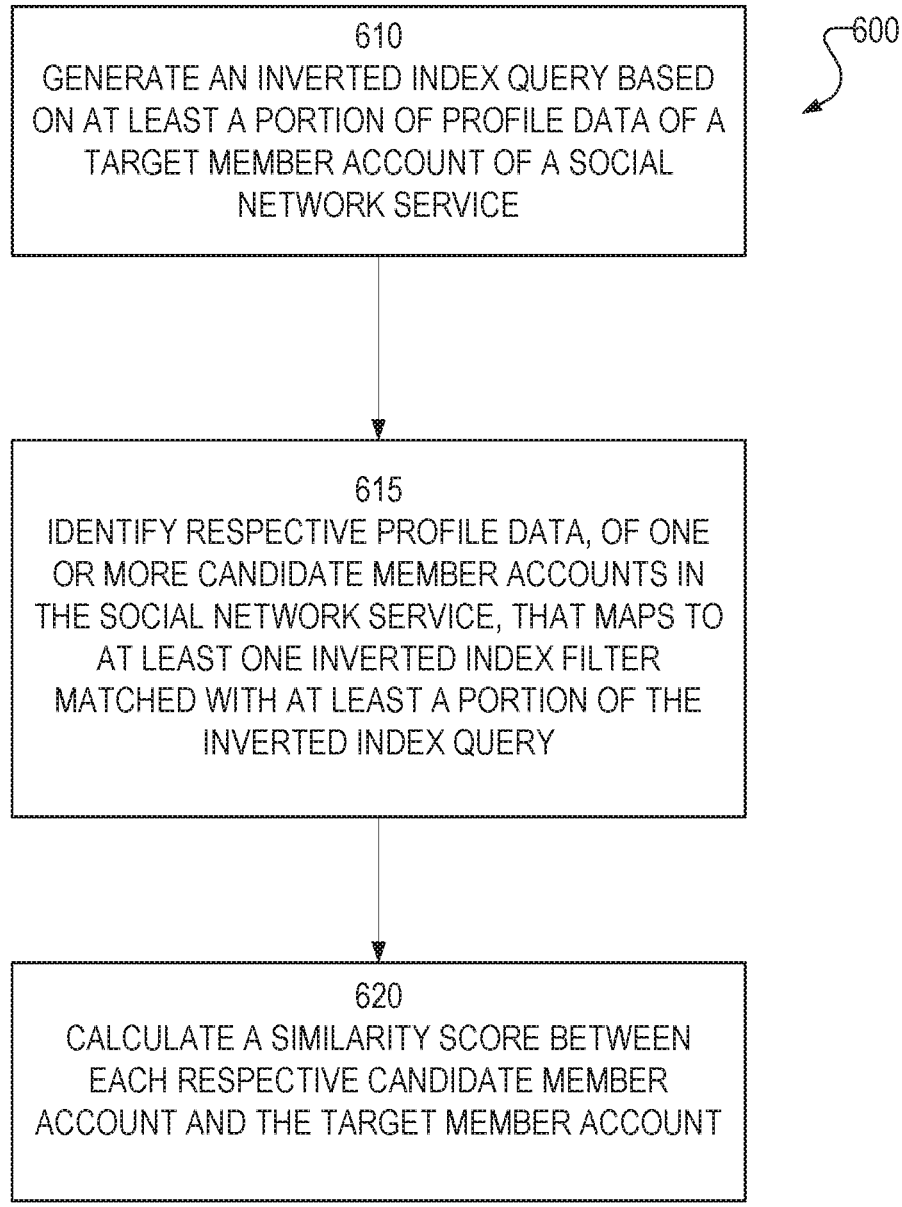
FIG. 6 is a flowchart illustrating an example method of a Similar Profiles Engine, according to various embodiments.

FIG. 6 is a flowchart 600 illustrating an example method, according to various embodiments.

At operation 610, the Similar Profiles Engine 206 generates an inverted index query based on at least a portion of profile data of a target member account of a SNS. The Similar Profiles Engine 206 populates the inverted index query with at least one of the following instances of types of profile data of the target member account: a country code identifier, a profile language, one or more industry identifiers, one or more skill tags, or one or more job title keywords. An instance of a particular type of profile data may be a value of the particular type of data (e.g., for the type of data "country code ID" the "instance" is "U.S.;" for the type of data "profile language" the "instance" is "English"). In some example embodiments, one or more types of profile data may be pre-selected or pre-defined automatically (e.g., according to a pre-selection rule) or by an administrator (e.g., an engineer).

At operation 615, the Similar Profiles Engine 206 identifies respective profile data, of one or more candidate member accounts in the SNS, that maps to at least one inverted index filter matched with at least a portion of the inverted index query. For example, the Similar Profiles Engine 206 identifies a first inverted index filter (e.g. "United States") that matches a first pre-selected type of profile data included in the inverted index query (country code "United States"). The Similar Profiles Engine 206 identifies in the inverted index one or more candidate member accounts that map to the first inverted index filter. That is, the Similar Profiles Engine 206 identifies member account identifiers listed in relation to (e.g., in association with) the first index filter, thereby representing that those member account identifiers are for candidate member accounts with profile data that includes the country code "United States".

The Similar Profiles Engine 206 identifies a second inverted index filter (e.g. "Software Engineer") that matches a second pre-selected type of profile data included in the inverted index query ("Software Engineer" job title). The Similar Profiles Engine 206 identifies in the inverted index one or more additional candidate member accounts that map to the second inverted index filter. That is, the Similar Profiles Engine 206 identifies additional member account identifiers listed in relation to (e.g., in association with) the second index filter, thereby representing that those additional member account identifiers are for candidate member accounts with profile data that includes the job title of "Software Engineer". The Similar Profiles Engine 206 generates a short-list of all the identified candidate accounts.

At operation 620, the Similar Profiles Engine 206 calculates a similarity score between each respective candidate member account and the target member account. The Similar Profiles Engine 206 creates a pairing between each candidate member account in the short-list and the target member account. For each pairing, the Similar Profiles Engine 206 calculating each respective similarity score according to a machine learned logistic regression model. The machine learned logistic regression model comprises a plurality of pre-defined features with corresponding regression coefficients. For example, the plurality of pre-defined features include at least one the following types of profile data: date of birth, graduation year, company identifier, job title, profile headline, or field of study. Based on one or more instances of types of pre-defined features present in a respective pairing, the Similar Profiles Engine 206 assembles feature and coefficient vectors to calculate a similarity score for the respective pairing.

In various example embodiments, the computation of similar member accounts via the Similar Profiles Engine 206 is performed offline via a Hadoop system. Use of the Hadoop system in an offline manner mitigates the inefficiency of computing similar member accounts online because they are not bound to change in a reasonable time frame.

Inverted indexes are usually used in online services where documents are retrieved and scored in response to an input request from a network resource. For various embodiments of the Similar Profiles Engine 206, retrieval from the inverted index can be performed offline so that all the results are computed and stored at once on a distributed file system ("HDFS") of the SNS. For this purpose, an offline IR (information retrieval) system of the Similar Profiles Engine 206 runs a search request on a Hadoop system ("Hadoop"). Unlike conventional systems, the Similar Profiles Engine 206 runs a Galene system-based index on Hadoop and performs query searches in the HDFS. Such aspects are achieved by linking the inverted index to a Hadoop mapper. Input queries (that correspond to a target member account for which similar member accounts are to be found) are read from the HDFS and relayed to the Hadoop mapper linked with the inverted index in order to retrieve one or more member accounts that match certain filters of the target member account (e.g., a country code, a language identifier, one or more industries, one or more skills, one or more job title identifiers, etc.). The retrieved member accounts are made available to the scoring model to score a plurality of pairs—where each pair includes the target member account and one of the retrieved member accounts.

In example embodiments of the Similar Profiles Engine 206, where the inverted index is very large, the inverted index can be split up into several shards such that each shard contains a disjoint set of member accounts. Given a plurality of shards of the inverted index, each shard is linked with a respective Hadoop mapper. Each query is relayed by the Similar Profiles Engine 206 to all the Hadoop mappers so that each inverted index query is run upon all the shards. Each Hadoop mapper produces a list of potential member account results from its respective shard. All these sets of member account results are then passed on to another layer of Hadoop nodes called reducers. A reducer merges results from all the mappers and sorts them all in decreasing order of scores, and returns a final list of similar profiles. In another embodiment, a subset of the entire population of member accounts (~100 million) is kept in the inverted index, where the subset of member accounts is selected on the basis on the number of profile views.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 7:
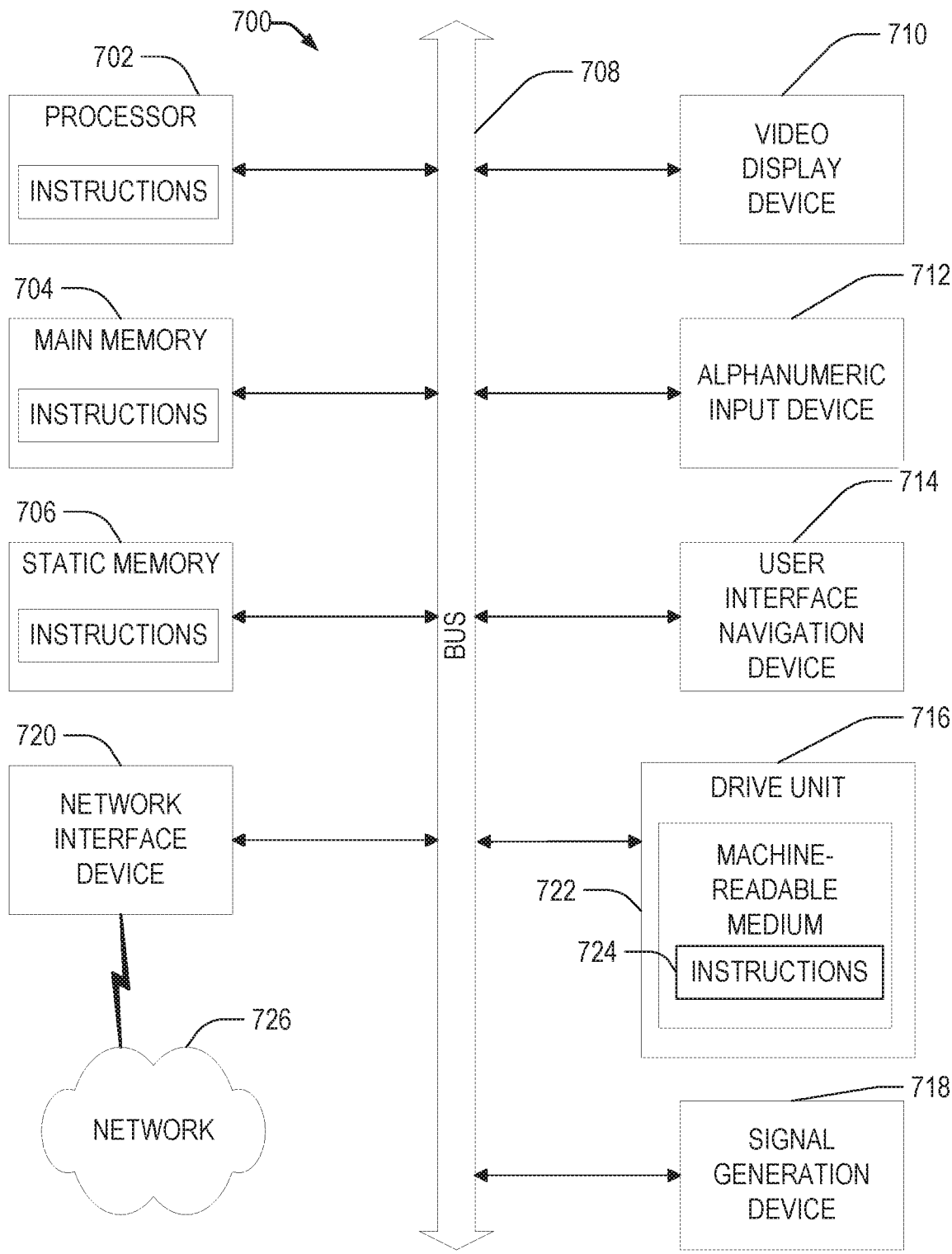
FIG. 7 is a block diagram of an example computer system on which operations, actions and methodologies described herein may be executed, in accordance with an example embodiment.

FIG. 7 is a block diagram of an example computer system 700 on which operations, actions and methodologies described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 700 includes a processor 702 (e.g., a central processing unit (CPU), a graphics processing unit (GPU) or both), a main memory 704, and a static memory 706, which communicate with each other via a bus 708. Computer system 700 may further include a video display device 710 (e.g., a liquid crystal display (LCD) or a cathode ray tube (CRT)). Computer system 700 also includes an alphanumeric input device 712 (e.g., a keyboard), a user interface (UI) navigation device 714 (e.g., a mouse or touch sensitive display), a disk drive unit 716, a signal generation device 718 (e.g., a speaker) and a network interface device 720.

Disk drive unit 716 includes a machine-readable medium 722 on which is stored one or more sets of instructions and data structures (e.g., software) 724 embodying or utilized by any one or more of the methodologies or functions described herein. Instructions 724 may also reside, completely or at least partially, within main memory 704, within static memory 706, and/or within processor 702 during execution thereof by computer system 700, main memory 704 and processor 702 also constituting machine-readable media.

While machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 724 may further be transmitted or received over a communications network 726 using a transmission medium. Instructions 724 may be transmitted using network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer system, comprising:
one or more hardware processors; and
a non-transitory machine-readable medium for storing instructions that, when executed by the one or more hardware processors, cause the one or more hardware processors to perform operations comprising:
generating an inverted index query based on at least a portion of profile data of a target member account of a social network service;
identifying respective profile data, of one or more candidate member accounts in the social network service, that maps to at least one inverted index filter, by:

identifying a first inverted index filter that matches a first pre-selected type of profile data included in the inverted index query;
identifying in the inverted index one or more candidate member accounts that map to the first inverted index filter;
identifying a second inverted index filter that matches a second pre-selected type of profile data included in the inverted index query; and
identifying in the inverted index one or more candidate member accounts that map to the second inverted index filter; and
generating a short list of the one or more candidate member accounts that map to the first inverted index filter, and the one or more candidate member accounts that map to the second inverted index filter; and
for each respective candidate member account, generating a pairing between the respective candidate member account and the target member account, and calculating a respective similarity score for the pairing.

2. The computer system of claim 1, wherein the generating of the inverted index query based on at least the portion of profile data of the target member account of the social network service includes:
populating the inverted index query with at least one of the following instances of pre- selected types of profile data of the target member account:
a country code identifier, a profile language identifier, one or more industry identifiers, one or more skill tags, or one or more job title keywords.

3. The computer system of claim 2, wherein the identifying of the respective profile data includes:
identifying a first inverted index filter that matches a first pre-selected type of profile data included in the inverted index query, the first pre-selected type profile data comprising a presence of a specific job title keyword in a profile section; and
identifying in the inverted index one or more candidate member accounts that map to the first inverted index filter, wherein respective profile data of each of the one or more candidate member accounts includes the presence of the specific job title keyword in the profile section.

4. The computer system of claim 1, wherein the calculating of the similarity score for the pairing of each respective candidate member account and the target member account includes:
calculating each respective similarity score according to a machine learned logistic regression model.

5. The computer system of claim 4, wherein the machine learned logistic regression model comprises a plurality of pre-defined features with corresponding regression coefficients, the plurality of pre-defined features including at least one of a date of birth, a graduation year, a company identifier, a job title, a profile headline, or a field of study.

6. A non-transitory machine-readable storage medium comprising instructions that, when executed by one or more hardware processors of a machine, cause the machine to perform operations comprising:
generating an inverted index query based on at least a portion of profile data of a target member account of a social network service;
identifying respective profile data, of one or more candidate member accounts in the social network service, that maps to at least one inverted index filter, the at least one inverted index filter matching at least a portion of the inverted index query, by:

identifying a first inverted index filter that matches a first pre-selected type of profile data included in the inverted index query;
identifying in the inverted index one or more candidate member accounts that map to the first inverted index filter;
identifying a second inverted index filter that matches a second pre-selected type of profile data included in the inverted index query; and
identifying in the inverted index one or more candidate member accounts that map to the second inverted index filter; and
generating a short list of the one or more candidate member accounts that map to the first inverted index filter, and the one or more candidate member accounts that map to the second inverted index filter; and
for each respective candidate member account, generating a pairing between the respective candidate member account and the target member account, and calculating a respective similarity score for the pairing.

7. The non-transitory machine-readable storage medium of claim 6, wherein the generating of the inverted index query based on at least the portion of profile data of the target member account of the social network service includes:
populating the inverted index query with at least one of the following instances of pre- selected types of profile data of the target member account:
a country code identifier, a profile language identifier, one or more industry identifiers, one or more skill tags, or one or more job title keywords.

8. The non-transitory machine-readable storage medium of claim 7, wherein the identifying of the respective profile data includes:
identifying a first inverted index filter that matches a first pre-selected type of profile data included in the inverted index query, the first pre-selected type profile data comprising a presence of a specific job title keyword in a profile section; and
identifying in the inverted index one or more candidate member accounts that map to the first inverted index filter, wherein respective profile data of each of the one or more candidate member accounts includes the presence of the specific job title keyword in the profile section.

9. The non-transitory machine-readable storage medium of claim 6, wherein the calculating of the similarity score for the pairing of each respective candidate member account and the target member account includes:
calculating each respective similarity score according to a machine learned logistic regression model.

10. The non-transitory machine-readable storage medium of claim 9, wherein the machine learned logistic regression model comprises a plurality of pre-defined features with corresponding regression coefficients, the plurality of pre-defined features including at least one of a date of birth, a graduation year, a company identifier, a job title, a profile headline, or a field of study.

11. A computer-implemented method, comprising:
generating an inverted index query based on at least a portion of profile data of a target member account of a social network service;
identifying respective profile data, of one or more candidate member accounts in the social network service, that maps to at least one inverted index filter, the at least one inverted index filter matching at least a portion of the inverted index query; and calculating, using one or more hardware processors, a similarity score between each respective candidate member account and the target member account by:
  identifying a first inverted index filter that matches a first pre-selected type of profile data included in the inverted index query;
  identifying in the inverted index one or more candidate member accounts that map to the first inverted index filter;
  identifying a second inverted index filter that matches a second pre-selected type of profile data included in the inverted index query; and
  identifying in the inverted index one or more candidate member accounts that map to the second inverted index filter; and
for each respective candidate member account, generating a pairing between the respective candidate member account and the target member account, and calculating a respective similarity score for the pairing.

12. The computer-implemented method of claim 11, wherein the generating of the inverted index query based on at least the portion of profile data of the target member account of the social network service includes:
  populating the inverted index query with at least one of the following instances of pre- selected types of profile data of the target member account: a country code identifier, a profile language identifier, one or more industry identifiers, one or more skill tags, or one or more job title keywords.

13. The computer-implemented method of claim 12, wherein the identifying of the respective profile data includes:
  identifying a first inverted index filter that matches a first pre-selected type of profile data included in the inverted index query, the first pre-selected type profile data comprising a presence of a specific job title keyword in a profile section; and
  identifying in the inverted index one or more candidate member accounts that map to the first inverted index filter, wherein respective profile data of each of the one or more candidate member accounts includes the presence of the specific job title keyword in the profile section.

14. The computer-implemented method of claim 11, wherein the calculating of the similarity score for the pairing of each respective candidate member account and the target member account includes:
  calculating each respective similarity score according to a machine learned logistic regression model, wherein the machine learned logistic regression model comprises a plurality of pre-defined features with corresponding regression coefficients, the plurality of pre-defined features including at least one of a date of birth, a graduation year, a company identifier, a job title, a profile headline, or a field of study.

* * * * *

UNITED STATES PATENT AND TRADEMARK OFFICE
CERTIFICATE OF CORRECTION

| | | |
|---|---|---|
| PATENT NO. | : 10,733,243 B2 | Page 1 of 1 |
| APPLICATION NO. | : 15/691623 | |
| DATED | : August 4, 2020 | |
| INVENTOR(S) | : Zhou et al. | |

It is certified that error appears in the above-identified patent and that said Letters Patent is hereby corrected as shown below:

On the Title Page

Item (72), in "Inventors", in Column 1, Line 4, before "Maharashtra", insert --Mumbai,--

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*